(12) United States Patent
Jo et al.

(10) Patent No.: US 8,659,733 B2
(45) Date of Patent: Feb. 25, 2014

(54) LIQUID CRYSTAL DISPLAY AND METHOD FOR FABRICATING THE SAME

(75) Inventors: Young-Jik Jo, Gyeongsangbuk-Do (KR); Pyung-Hun Kim, Gyeongsangbuk-Do (KR)

(73) Assignee: LG Display Co., Ltd., Seoul (KR)

( * ) Notice: Subject to any disclaimer, the term of this patent is extended or adjusted under 35 U.S.C. 154(b) by 211 days.

(21) Appl. No.: 12/213,550

(22) Filed: Jun. 20, 2008

(65) Prior Publication Data

US 2009/0040449 A1 Feb. 12, 2009

(30) Foreign Application Priority Data

Jun. 22, 2007 (KR) .................. 10-2007-0061814

(51) Int. Cl.
*G02F 1/13* (2006.01)
*G02F 1/1343* (2006.01)

(52) U.S. Cl.
USPC .................. 349/141; 349/143; 349/187

(58) Field of Classification Search
USPC ........................... 349/141, 143, 187
See application file for complete search history.

(56) References Cited

U.S. PATENT DOCUMENTS

| 6,791,647 | B1* | 9/2004 | Kim et al. ............. 349/129 |
| 7,659,959 | B2* | 2/2010 | Kim et al. ............. 349/141 |
| 2004/0080700 | A1* | 4/2004 | Kang ...................... 349/141 |
| 2005/0078256 | A1* | 4/2005 | Hong ...................... 349/141 |
| 2005/0174521 | A1* | 8/2005 | Nishida et al. ........ 349/141 |
| 2006/0055861 | A1* | 3/2006 | Hirota ................... 349/141 |
| 2006/0250560 | A1* | 11/2006 | Lee et al. ............... 349/141 |
| 2007/0081107 | A1* | 4/2007 | Huitema et al. ........ 349/42 |

* cited by examiner

*Primary Examiner* — Mark Robinson
*Assistant Examiner* — Jerry Blevins
(74) *Attorney, Agent, or Firm* — Morgan, Lewis & Bockius LLP

(57) ABSTRACT

A liquid crystal display device includes: a plurality of gate lines and a plurality of data lines formed horizontally and vertically to define pixel areas on a substrate; thin film transistors (TFTs) formed at crossings of the gate lines and data lines; a common line formed to be parallel to the gate line; a common electrode formed at each pixel area, connected to the gate line, and having one end overlapping with the data line; and a pixel electrode connected to the TFT and formed to be parallel to the common electrode between the common electrodes formed at each pixel area. The common electrode has a mesh structure to thus reduce a potential deviation of common electrodes in a panel and restrain a reduction in an aperture ratio.

14 Claims, 7 Drawing Sheets

LIQUID CRYSTAL DISPLAY AND METHOD FOR FABRICATING THE SAME

BACKGROUND OF THE INVENTION

1. Field of the Invention

The present invention relates to a liquid crystal display (LCD) capable of reducing potential deviation of a common electrode of a panel by forming the common electrode to have a mesh structure, and also capable of restraining the reduction of an aperture ratio.

2. Description of the Related Art

Recently, in line with the rapid development of an information and communication sector, the importance of the display industry for displaying desired information is increasing, and, among display devices up to date, the CRTs (Cathode Ray Tubes) have been much popular because of its advantages of displaying various colors and exerting bright screen image.

However, the desires for a display which is large and portable and has high resolution urgently request development of a flat panel display instead of the heavy and voluminous CRTs. Such flat panel display can be variably and extensively applied from computer monitors to aircrafts, spacecrafts, etc.

Currently manufactured or developed flat panel displays include a liquid crystal display (LCD), an electroluminescent display (ELD), a field emission display (FED), a plasma display panel (PDP), or the like.

An ideal flat panel display would have such characteristics that it is light, has high luminance, high efficiency, high resolution, a fast response characteristics, is driven at a low voltage, consumes less power, incurs a low cost, and has natural color display characteristics, etc.

Among the flat panel displays, the LCD receives much attention as it meets the demands and has durability and portability.

In general, the LCD is an image display device using optical anisotropy characteristics of liquid crystal. That is, light is irradiated to liquid crystal having polarization characteristics according to a voltage applied state, and the amount of light that passes through the liquid crystal is controlled according to an alignment state of the liquid crystal according to an applied voltage to thus display an image.

To configure the LCD, a liquid crystal panel including a liquid crystal layer and a circuit which is provided near the liquid crystal panel to apply signals to the liquid crystal panel and control the signals are required.

The related art in-plane switching (iPS) mode LCD will now be described with reference to FIG. 1.

FIG. 1 is a plan view schematically showing the related art IPS mode LCD.

With reference to FIG. 1, the related art IPS mode LCD includes a plurality of gate lines 23 and a plurality of data lines 23 vertically and horizontally to define pixel areas (not shown), a common line 15 arranged to be parallel to the gate line 13, and a plurality of common electrodes 29a and 29b connected to the common line 15 and formed to be parallel to the data line 23.

In addition, a thin film transistor (TFT), including a gate electrode (not shown), a gate insulating layer (not shown), a semiconductor layer (not shown) and source and drain electrodes 23a and 23b, is formed at each crossing of the gate lines 13 and the data lines 23.

Pixel electrodes 27 are formed to be connected to the drain electrode 23b and formed between the common electrodes 29b at each pixel area.

In the pixel area, the pixel electrode 27 and the common electrode 29 are formed to be parallel to the data line 23, and a horizontal electrode portion 27a of the pixel electrode 27 overlaps with the common line 15 to form a storage capacity.

Accordingly, when a data voltage is applied via the TFT, an in-plane field (horizontal field) is formed between the common electrode 29 and the pixel electrode 27.

A connection structure of the common electrode and the data line will now be described with reference to FIGS. 2 and 3.

FIG. 2 is a sectional view taken along line II-II in FIG. 1, and FIG. 3 is a sectional view taken along line III-III in FIG. 1.

With reference to FIGS. 2 and 3, in the related art LCD, the gate line (13 in FIG. 1), a gate electrode (not shown), the common line 15 and the common electrode 29b are formed on a lower substrate 11. A gate insulating layer 17 is formed on the entire surface of the substrate including the gate line and the common line, and a semiconductor layer (not shown) is formed on the gate insulating layer 17 at an upper side of the gate electrode (not shown).

In addition, on the gate insulating layer 17, there are formed the data lien 23, source and drain electrodes 23a and 23b, and the pixel electrode 27 such that the are perpendicular to the gate line 13, and a protection layer 25 is formed between the source and drain electrodes 23a and 23b and the pixel electrodes 27.

Although not shown, a black matrix layer (not shown) is formed at portions excluding the pixel areas on an upper substrate facing the lower substrate 11, and a color filter layer (not shown) is formed at each pixel area.

A liquid crystal layer (not shown) is formed between the upper substrate including the color filter layers (not shown) and the lower substrate 11.

Accordingly, when a data voltage is applied to the pixel electrode 27, an in-plane field is formed due to a voltage difference between the pixel electrode 27 and the common electrode 29, and the liquid crystal can be aligned by the in-plane field.

The related art IPS mode LCD has the following problems.

A coupling phenomenon occurs at the common electrodes or the common lines overlapping with the data lines, causing a defective screen image.

In addition, if ripples are generated due to a coupling capacitance of signals of the common electrode Vcom, a potential deviation of the common electrodes (Vcom) in the panel increases.

SUMMARY OF THE INVENTION

Therefore, in order to address the above matters the various features described herein have been conceived. One aspect of the exemplary embodiments is to provide a liquid crystal display (LCD) capable of reducing a potential deviation of common electrodes in a panel by forming the common electrodes to have a mesh structure, and capable of restraining the reduction of an aperture ratio.

This specification provides an LCD including: a plurality of gate lines and a plurality of data lines formed horizontally and vertically to define pixel areas on a substrate; thin film transistors (TFTs) formed at crossings of the gate lines and data lines; a common line formed to be parallel to the gate line; a common electrode formed at each pixel area, connected to the gate line, and having one end overlapping with the data line; and a pixel electrode connected to the TFT and formed to be parallel to the common electrode between the common electrodes formed at each pixel area.

This specification also provides an LCD including: a plurality of gate lines and a plurality of data lines formed horizontally and vertically to define pixel areas on a substrate; thin film transistors (TFTs) formed at crossings of the gate lines and data lines; a common line formed to be parallel to the gate line; a common electrode formed at each pixel area, connected to the common line, and having one end overlapping with the data line at every one of the N number of pixel areas; and a pixel electrode connected to the TFT and formed to be parallel to the common electrode between the common electrodes formed at each pixel area.

This specification also provides a method for fabricating an LCD including: forming a plurality of gate lines and a plurality of data line horizontally and vertically to define pixel areas on a substrate; forming a TFT including a gate electrode, a semiconductor layer, and source and drain electrodes at each crossing of the gate line and the data line; forming a common line parallel to the gate line; forming a common electrode positioned at the pixel area, connected to the common line, and having one end overlapping with the data line; and forming a pixel electrode connected with the drain electrode and being parallel to the common electrode between the common electrodes formed at each pixel area.

The foregoing and other objects, features, aspects and advantages of the present invention will become more apparent from the following detailed description of the present invention when taken in conjunction with the accompanying drawings.

DETAILED DESCRIPTION OF THE INVENTION

The liquid crystal display (LCD) and its fabrication method according to embodiments of the present invention will now be described in detail with reference to the accompanying drawings.

Figure 1:
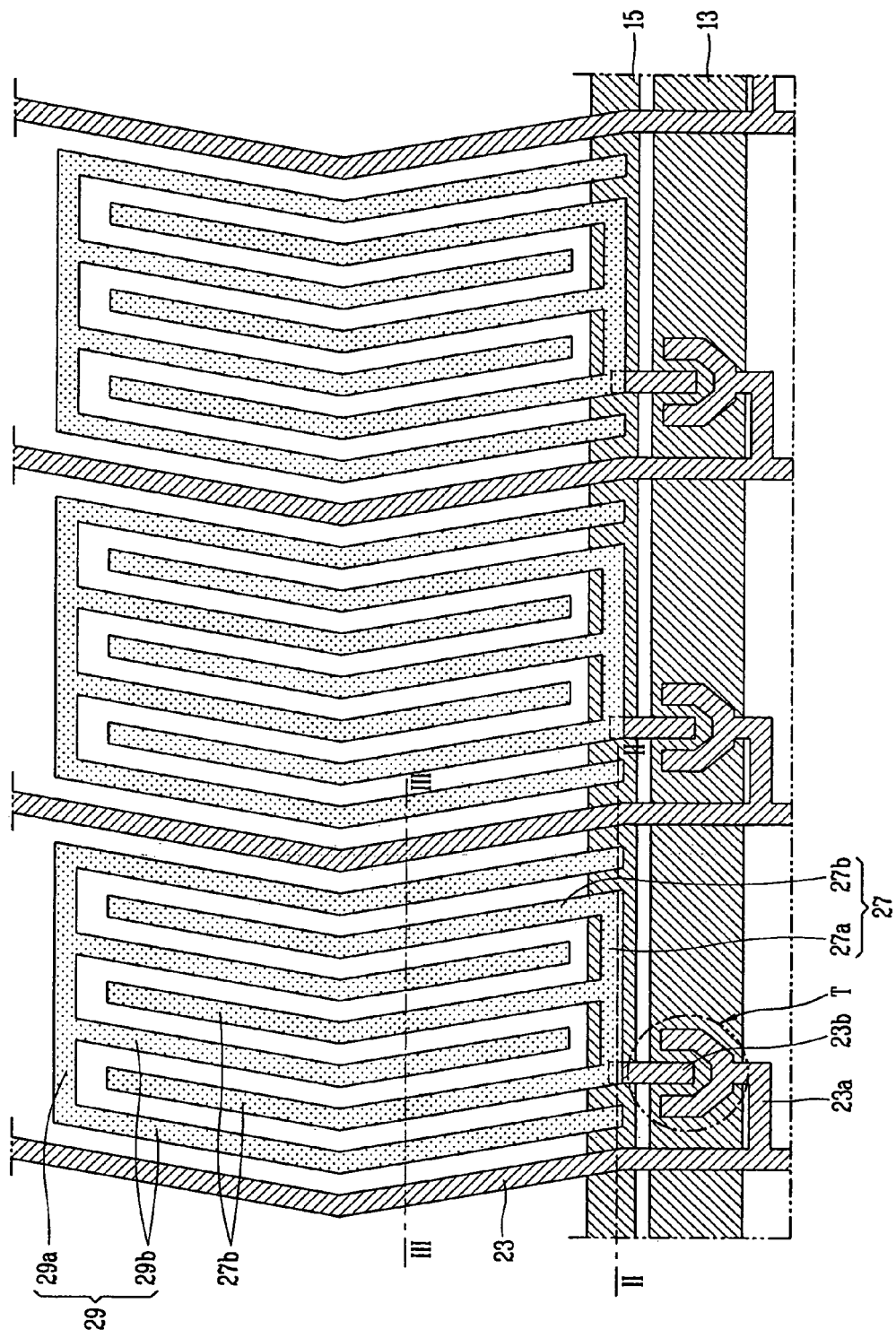
FIG. 1 is a plan view schematically showing an in-plane switching (IPS) mode liquid crystal display (LCD) according to the related art.
Figure 2:
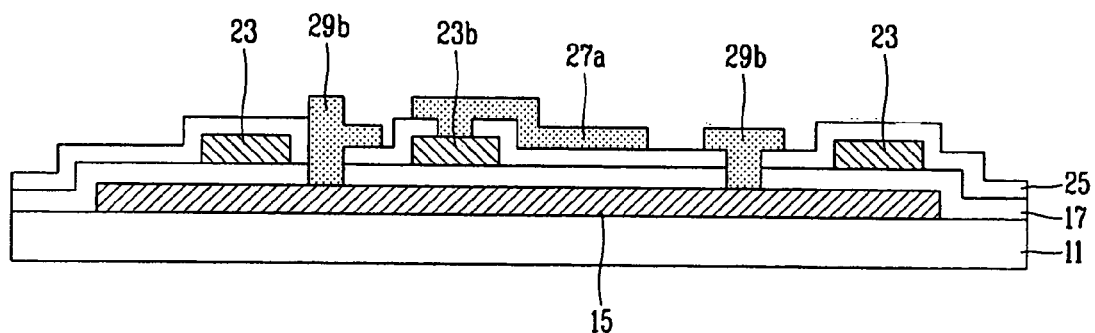
FIG. 2 is a sectional view taken along line II-II in FIG. 1.
Figure 3:
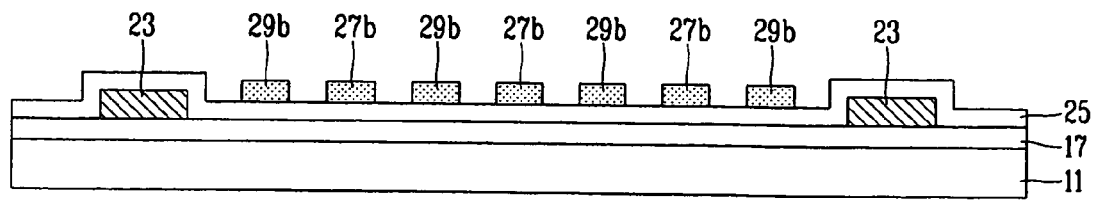
FIG. 3 is a sectional view taken along line III-III in FIG. 1.
Figure 4:
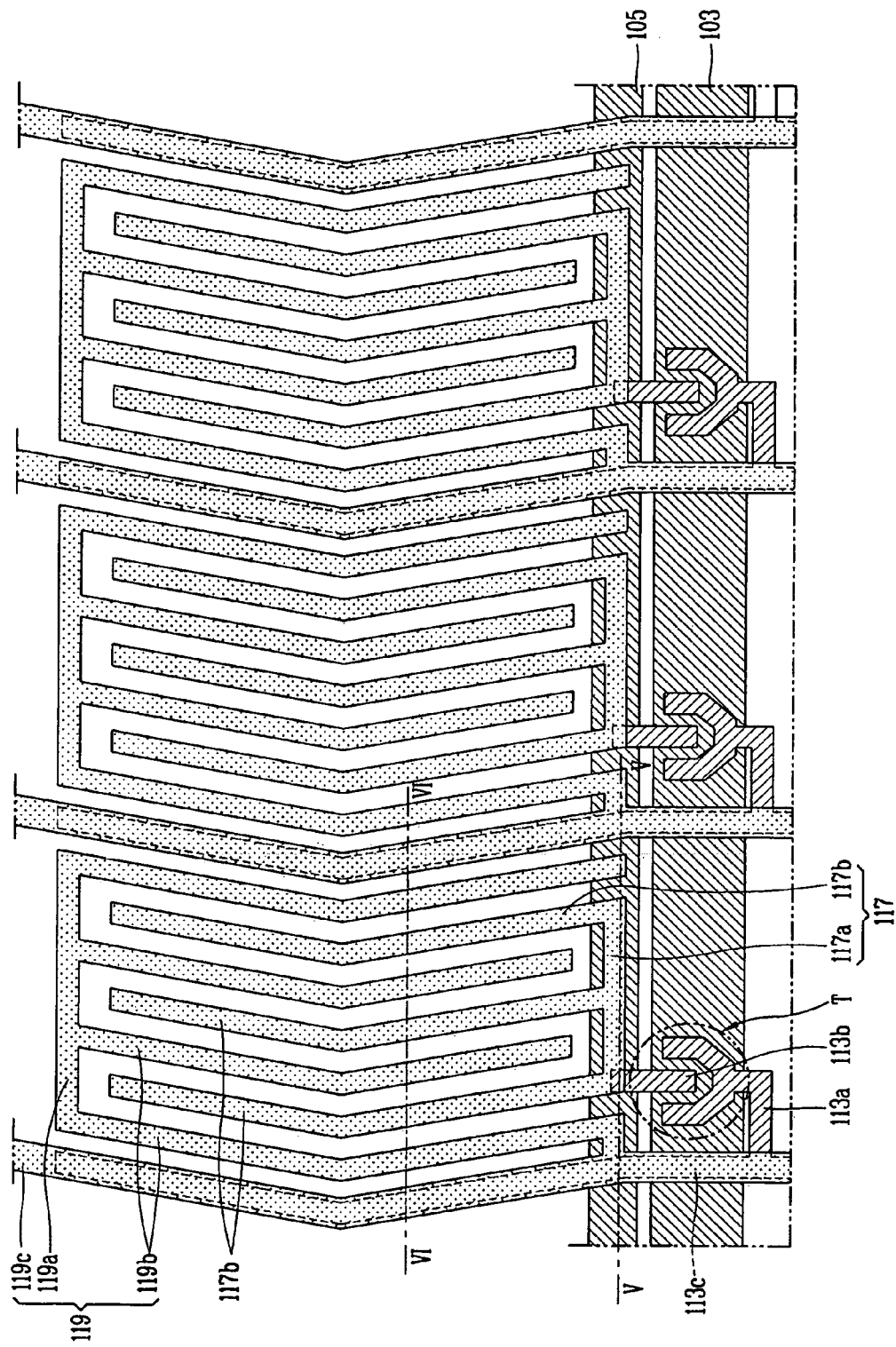
FIG. 4 is a plan view schematically showing an IPS mode LCD according to one embodiment of the present invention.

FIG. 4 is a plan view schematically showing an IPS mode LCD according to one embodiment of the present invention.

Figure 5:
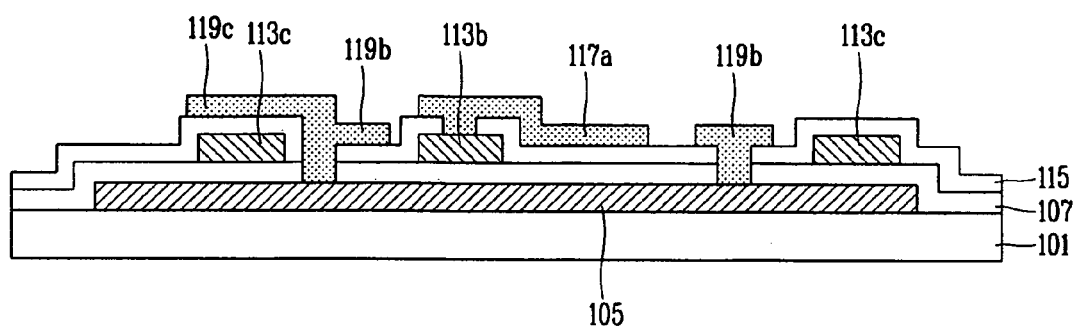
FIG. 5 is a sectional view taken along line V-V in FIG. 4.

The LCD according to one embodiment of the present invention includes a plurality of gate lines 103 arranged in one direction, and a plurality of data lines 113c perpendicular to the gate lines 103 to define pixel areas on a lower substrate (See 101 in FIG. 5).

Thin film transistors (T) are formed at each crossing of the gate line 103 and the data line 113c, and pixel electrodes 117 are formed to be electrically connected with a drain electrode 113b of the TFT (T) and parallel to the data lines 113c.

The pixel electrodes 117 include a plurality of horizontal electrode portions 117a and a plurality of vertical electrode portions 117b.

A common electrode 105 is formed to be parallel to each gate line 103, and common electrodes 119 are formed to be connected to the common line 105 and parallel to the data lines 113c and the pixel electrodes 117 between the pixel electrodes at each pixel area.

A first vertical electrode portion 119c of the common electrode 119 overlaps with the data line 113c, and one end and the other end of a second vertical electrode portion 119b are electrically connected with the common line 105.

A horizontal electrode portion 119a of the common electrode 119 overlaps with the common line 105.

The horizontal width of the first vertical electrode portion 119c overlapping with the data line 113c is larger than that of the data line 113c.

The IPS mode LCD according to one embodiment of the present invention will now be described in detail with reference to FIGS. 5 and 6.

Figure 6:
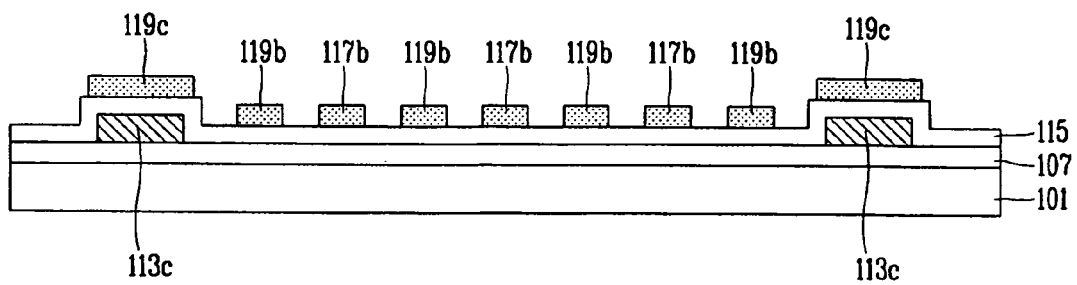
FIG. 6 is a sectional view taken along line VI-VI in FIG. 4.

FIG. 5 is a sectional view taken along line V-V in FIG. 4, and FIG. 6 is a sectional view taken along line VI-VI in FIG. 4.

With reference to FIGS. 5 and 6, the plurality of gate lines (See 103 in FIG. 4) are formed at certain intervals on the lower substrate 101 and at the same time the plurality of common lines 015 are formed in a direction perpendicular to the gate lines 103.

In this case, the gate lines 103 are formed such that a gate electrode (See 103a in FIG. 7a) is protruded from the gate line 103 at each pixel area.

A gate insulating layer 107 is formed on the entire surface of the lower substrate 101 including the gate lines 103 and the common lines 105. A semiconductor layer (See 109 in FIG. 7a) is formed on the gate insulating layer 107 at an upper portion of the gate electrode 103a. The data lines 113c are formed in the direction perpendicular to the gate lines 103. The pixel electrode 117 and the common electrode 119 including the plurality of horizontal electrode portions 117a and 119a and the plurality of vertical electrode portions 117b, 119b and 119c.

Here, the first vertical electrode portion 119c of the common electrode 119 overlaps with the data line 113, and the width of the vertical electrode portion 119c is larger than that of the data line 113c as shown in FIG. 6.

Both ends of the second vertical electrode portion 119b of the common electrode 119 are electrically connected with the common line 105 as shown in FIG. 5, and the horizontal electrode portion 117a of the pixel electrode 117 is electrically connected with the drain electrode 113b.

A protection layer 115 is formed on the entire surface of the lower substrate 101 including the data line 113c, the source electrode 113a and the drain electrode 113b, and both ends of the second vertical electrode portion 119b of the common electrode 119 are electrically connected with the common line 105 via a contact hole (not shown) formed in the protection layer 115, and the horizontal electrode portion 117a of the pixel electrode 117 is electrically connected with the drain electrode 113b.

A first alignment layer (not shown) is formed on the entire surface of the protection layer 115 including the pixel electrode 117 and the common electrode 119.

Although not shown, a black matrix layer (not shown) for blocking light to the portions corresponding to the gate lines 103 and the data lines 113c, excluding the pixel areas is formed on the upper substrate (not shown), and R, G and B color filter layers (not shown) for implementing colors are formed at the portions corresponding to the pixel areas.

A second alignment layer (not shown) is formed on the entire surface of the upper substrate including the color filter layer (not shown).

The upper substrate (not shown) and the lower substrate 101 are attached with a certain space therebetween in a facing manner, and a liquid crystal layer (not shown) is formed between the upper substrate (not shown) and the lower substrate 101.

Accordingly, in the IPS mode LCD according to one embodiment of the present invention, because the first vertical electrode-portions of the common electrodes overlap with the plurality of data lines, respectively, generation of ripples caused by a coupling storage capacitance of common electrode signals can be restrained to reduce a potential deviation of the common electrodes in the panel.

A method for fabricating the IPS mode LCD constructed as described above will now be described with reference to FIGS. 7a to 7f.

FIGS. 7a to 7f are sectional views sequentially showing a method for fabricating the IPS mode LCD according to an embodiment of the present invention.

Figure 7A:
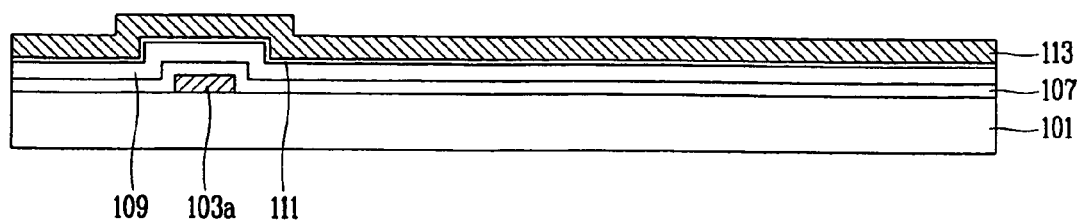
FIGS. 7a to 7f are sectional views sequentially showing a method for fabricating the IPS mode LCD according to an embodiment of the present invention.

With reference to FIG. 7a, a metallic material is deposited on the lower substrate 101 made of transparent glass and selectively patterned through a masking process to form the gate line 103 and the gate electrode 103a protruded from the gate line.

In this case, the metallic material may include an aluminum-based metal such as Al, an Al alloy, etc., a silver-based metal such as Ag, an Ag alloy, etc., a molybdenum-based metal such as Mo, an Mo alloy, etc., Cr, Ti, Ta, etc.

In addition, the metallic film may include two layers each having different physical properties, namely, a lower layer and an upper layer. The upper layer may be made of a metal with low resistivity, such as an aluminum-based metal or silver-based metal, in order to reduce a signal delay or a voltage drop of the gate line.

The lower layer may be made of a different material, in particular, a material having good physical, chemical and electrical contact characteristics with ITO (Indium Tin Oxide) or IZO (Indium Zinc Oxide). For example, the lower layer may be made of Ti, Ta, Cr, Mo-based metal, etc. The combination of the lower layer and the upper layer can be, for example, a Cr/Al—Nd alloy.

The gate insulating layer 105 made of SiNx, etc., is formed on the lower substrate 101 including the gate line 103 and the gate electrode 103a.

Subsequently, the semiconductor layer 109 made of hydrogenated amorphous silicon, etc., is formed on the gate insulating layer 107.

And then, an ohmic contact layer 111 made of a material such as n+ hydrogenated amorphous silicon, etc., in which silicide or 'n' type impurities are doped with a high density, is formed on the semiconductor layer 109, on which a first metallic material layer 113 for data lines is deposited thereon.

Figure 7B:
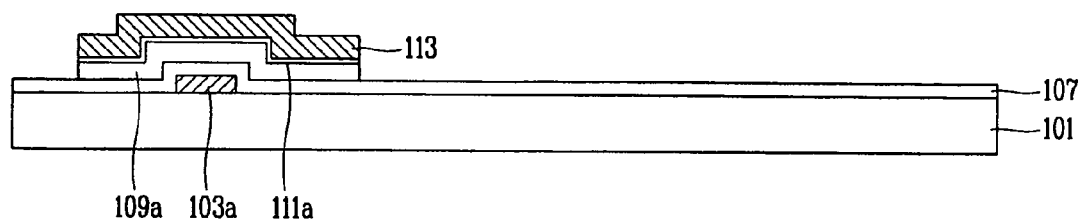

Thereafter, with reference to FIG. 7b, the ohmic contact layer 111, the semiconductor layer 109 and the metallic material layer 113 are selectively patterned through a masking process to form an active pattern 109a, an ohmic contact pattern 111a and a first metallic material layer pattern 113.

Figure 7C:
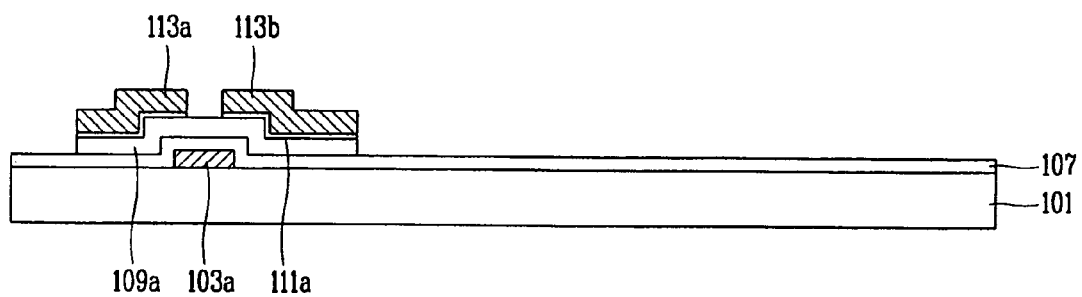

And then, as shown in FIG. 7c, the first metallic material layer pattern 113 and the ohmic contact pattern 111a are selectively patterned to form the data line 113c, the source electrode 113a protruded from the data line 113c and the drain electrode 113b spaced apart from the source electrode 113a.

The data line 113c is formed to cross the gate line 103, and the source 113a and the drain electrode 113b constitute the TFT, a switching element, together with the lower gate electrode 103a.

A channel of the TFT (T) is formed in the active pattern 109a between the source electrode 113a and the drain electrode 113b.

As the first metallic material for forming the data line 113c, an aluminum-based metal, a silver-based metal, a molybdenum-based metal, Cr, Ti, Ta, etc. may be used, and may be made of a multi-layer.

Figure 7D:
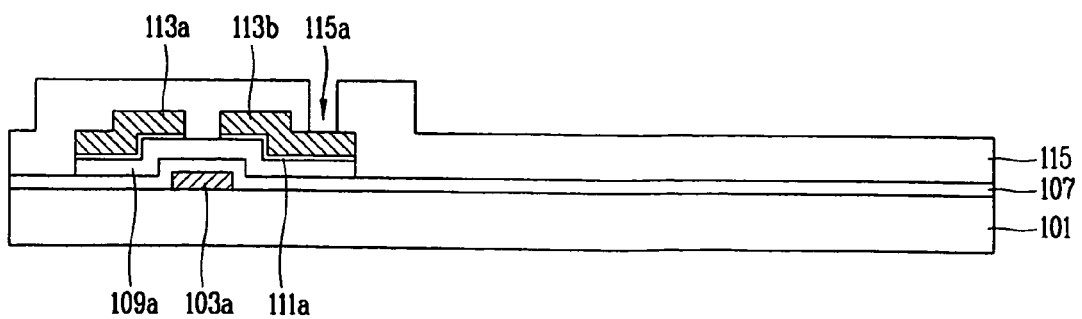

With reference to FIG. 7d, the protection layer 115 made of an organic material, an insulation material having low permittivity characteristics or silicon nitride, an inorganic material, is formed on the data line 113c and the source and drain electrodes 113a and 113b.

Subsequently, the protection layer 115 is selectively patterned through a masking process to form a contact hole exposing a portion of the drain electrode 113b in the protection layer 115. At this time, a contact hole (not shown) exposing the common line 105 is also formed together when the contact hole 115a is formed.

Figure 7E:
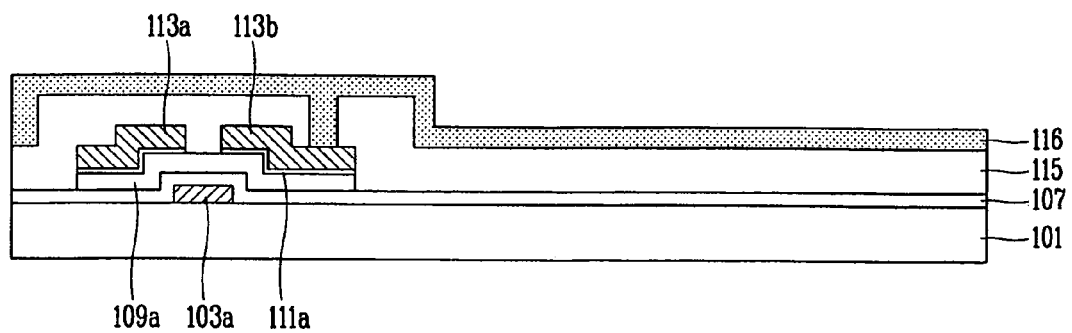
Figure 7F:
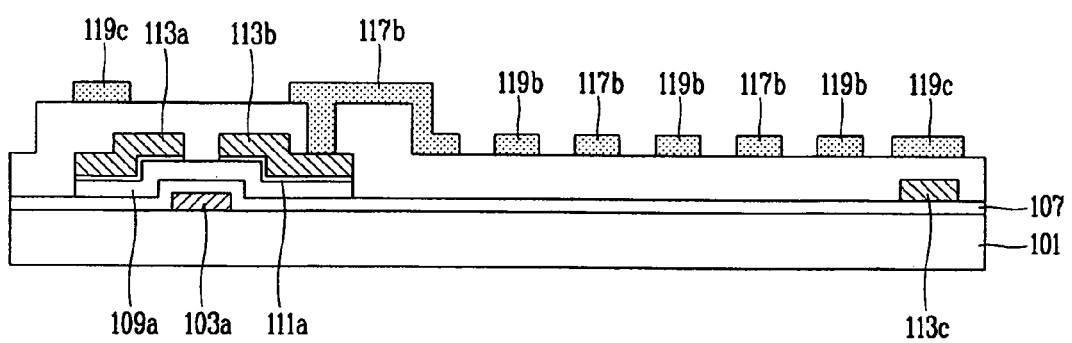

Thereafter, as shown in FIGS. 7e and 7f, a second metallic material layer 116 made of a transparent conductive material such as ITO or IZO is deposited on the protection layer 115 including the contact hole 115a and then selectively removed through a masking process to form the pixel electrode 117 and the common electrode 119.

The pixel electrode 117 includes a plurality of horizontal electrode portions 117a and a plurality of vertical electrode portions 117b, and the common electrode 119 includes a plurality of horizontal electrode portions 119a and first and second vertical electrode portions 119c and 119b. Here, the first vertical electrode portion 119c of the common electrode overlaps with the data line 113c.

In addition, the width of the first vertical electrode portion 119c is larger than that of the data line 113c. The first vertical electrode portion 119c of the common electrode positioned at each pixel area overlaps with each data line 113c.

When the data voltage is applied, the pixel electrode 117 generates an electric field together with the common electrode 119 which has received the common voltage, thereby arranging liquid crystal molecules of the liquid crystal layer (not shown) between the pixel electrode 117 and the common electrode 119.

Thereafter, a first alignment layer (not shown) is formed on the protection layer 115 including the pixel electrodes 117 and the common electrodes 119.

Meanwhile, although not shown, black matrixes are formed with an opaque metallic material on the upper substrate (not shown) to define a plurality of unit cell areas.

The black matrixes (not shown) absorb light made incident from adjacent cells to thus prevent degradation of the contrast.

And then, R, G and B color filter layers (not shown) are formed between the black matrixes on the surface of the upper substrate (not shown).

The color filter layers include red (R), green (G), and blue (B) color filters to display color by allowing light of a particular wavelength band to transmit therethrough.

Subsequently, a second alignment layer (not shown) is formed on the upper substrate (not shown) including the color filter layers and the black matrixes.

In this manner, the array process is performed on the lower substrate 101 and the upper substrate (not shown) and the liquid crystal layer (not shown) is formed between the lower substrate 101 and the upper substrate (not shown) to thus complete the process of fabricating a liquid crystal panel.

The LCD according to another embodiment of the present invention will now be described with reference to FIG. 8.

Figure 8:
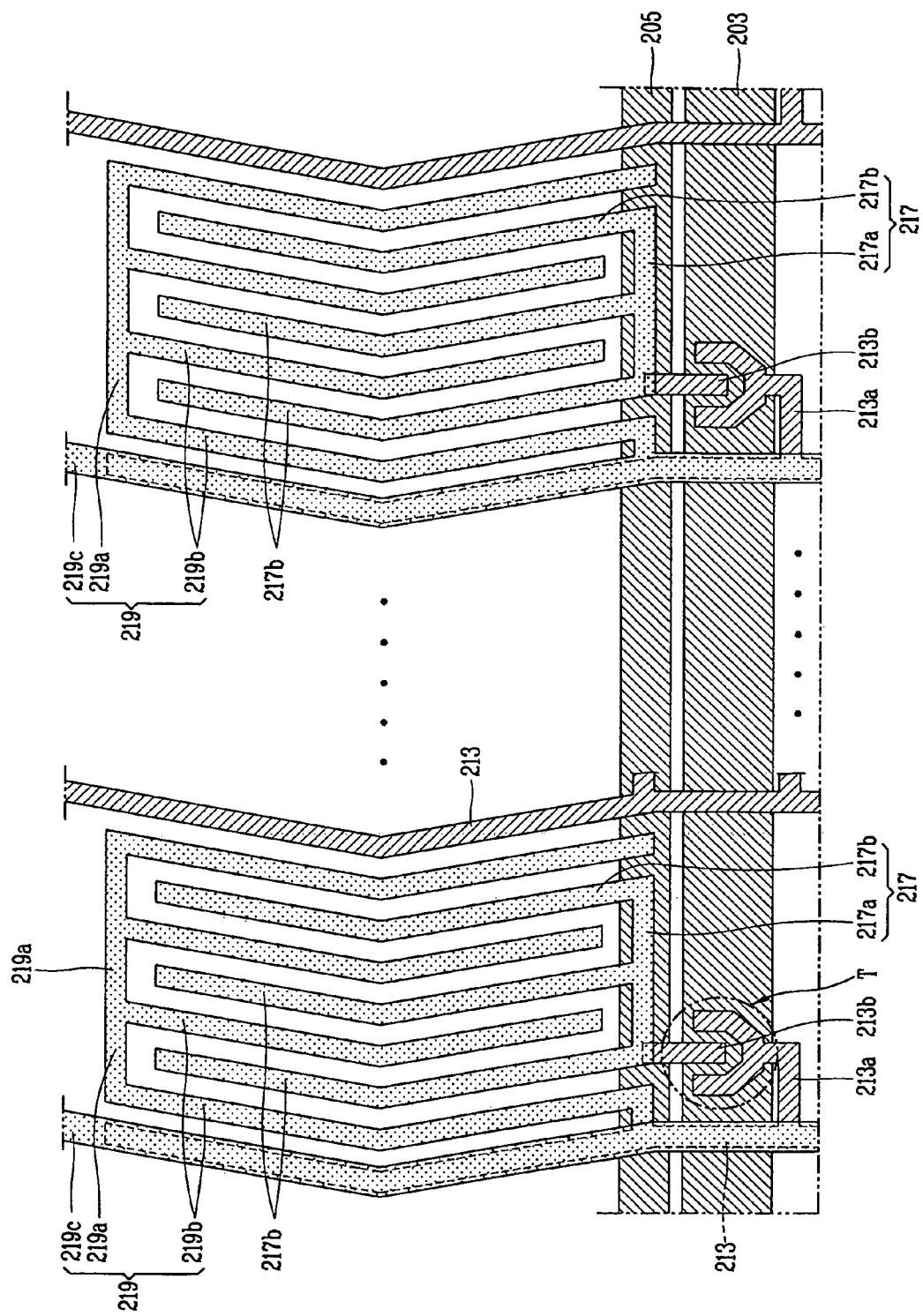
FIG. 8 is a plan view showing an IPS mode LCD according to another embodiment of the present invention.

FIG. 8 is a plan view showing an IPS mode LCD according to another embodiment of the present invention.

With reference to FIG. 8, the LCD according to another embodiment of the present invention includes a plurality of gate lines 203 arranged in one direction on a lower substrate (not shown) (See 101 in FIG. 5) and a plurality of data lines 213 arranged in a direction perpendicular to the gate lines 203 to define a plurality of unit pixel areas.

The TFTs (T) are formed at crossings of the gate lines 203 and the data lines 213, and pixel electrodes 217 are formed to be electrically connected with drain electrodes 213b of the TFTs (T) and formed to be parallel to the data lines 213.

The pixel electrode 217 includes a plurality of vertical electrode portions 217a and a plurality of horizontal electrode portions 217b.

A common line 205 is formed to be parallel to the gate lines 203, and common electrodes 219 are formed to be connected with the common line 205 and formed to be parallel to the data lines 213 and the pixel electrodes 217 and between the pixel electrodes 217 at each pixel area.

The first vertical electrode portion 219c of the common electrode 219 overlaps with the data line 213, and one and the other ends of a plurality of second vertical electrode portions 219b of the common electrode 219 are electrically connected with the common line 205.

In this case, the first vertical electrode portion 219c of the common electrode 219 is formed in a single unit pixel area among the N number of unit pixel areas and overlaps with the data line 213 defining the unit pixel area.

Here, the N number range of unit pixel regions refers to substantially three to twenty four unit pixel areas. In this case, if the N number range exceeds the twenty four unit pixel areas, an in-plane deviation of the common electrode Vcom would be about 100 mv or greater. Then, the effect obtained by using the mesh structure cannot be obtained.

Thus, according to the embodiment of the present invention, the mesh-type common electrode is not formed at each unit pixel area but formed at a single unit pixel area among the N number of unit pixel areas, so that a reduction in an aperture ratio of the panel can be reduced and the luminance and contrast ratio of the panel can be increased.

The horizontal electrode portion 219a of the common electrode 219 overlaps with the common line 205.

The horizontal width of the first vertical electrode portion 219c of the common electrode 219 overlapping with the data line 213 is larger than that of the data line 213.

The IPS mode LCD according to another embodiment of the present invention will now be described in more detail with reference to FIG. 8.

With reference to FIG. 8, the plurality of gate lines 203 are formed at uniform intervals on the lower substrate and, at the same time, the plurality of common lines 205 are formed to be parallel to the gate lines 203.

In this case, a gate electrode (not shown) (See 103a in FIG. 7a) is formed to be protruded from each gate line 203 at each pixel area.

The gate insulating layer (not shown) is formed on the entire surface of the lower substrate (not shown) including the gate lines 203 and the common lines 205. The semiconductor layer (not shown) (See 109 in FIG. 7a) is formed on the gate insulating layer (not shown). The data line 213 is formed in a direction perpendicular to the gate line 203. The pixel electrode 217 and the common electrode 219 including the plurality of horizontal electrode portions 217a and 219a and the vertical electrode portions 217b and 219b are formed at each pixel area.

The vertical electrode portion 219c is additionally formed on the common electrode 219 positioned at a single pixel area among the N number of pixel areas among the plurality of pixel areas, and the vertical electrode portion 219c overlaps with the data line 213 positioned at the pixel area.

Here, the N number range of unit pixel regions refers to substantially three to twenty four unit pixel areas. In this case, if the N number range exceeds the twenty four unit pixel areas, an in-plane deviation of the common electrode Vcom would be about 100 mv or greater. Then, the effect for employing the mesh structure cannot be obtained.

Thus, according to the embodiment of the present invention, the mesh-type common electrode is not formed at each unit pixel area but formed at a single unit pixel area among the N number of unit pixel areas, so that a reduction in an aperture ratio of the panel can be reduced and the luminance and contrast ratio of the panel can be increased.

Although not shown, both ends of the second vertical electrode portion 219b of the common electrode 219 are electrically connected with the common line 205, and the horizontal electrode portion 217a of the pixel electrode 217 is electrically connected with the drain electrode 213b.

Here, a protection layer (not shown) is formed on the entire surface of the lower substrate (not shown) including the data line 213, the source electrode 213a and the drain electrode 213b, and the both ends of the second vertical electrode portion 219b of the common electrode 219 are electrically directly connected with the common line 205 via a contact hole (not shown) formed in the protection layer (not shown), and the horizontal electrode portion 217a of the pixel electrode 217 is electrically connected with the drain electrode 213b.

A first alignment layer (not shown) is formed on the entire surface of the protection layer 215 including the pixel electrode 217 and the common electrode 219.

Although not shown, a black matrix layer (not shown) is formed at portions corresponding to the gate line 203 and the data line 213 except for the pixel area on the upper substrate (not shown) to block light, and R, G and B color filter layers (not shown) are formed to implement colors at portions corresponding to the pixel areas.

A second alignment layer (not shown) is formed on the entire surface of the upper substrate including the color filter layers (not shown).

The upper substrate (not shown) and the lower substrate 201 are attached in a facing manner with a certain space therebetween, and a liquid crystal layer (not shown) is formed between the upper substrate (not shown) and the lower substrate 201.

A change in an aperture ratio when the mesh-type common electrode is disposed at one pixel area among the N number of pixel areas will now be described.

Although not shown, when the mesh-type common electrode, namely, the common electrode is disposed to overlap with the data line at one pixel area among three pixel areas, among six pixel areas, twelve pixel areas and twenty four pixel areas, the aperture ratio was reduced by about 1.52%, 0.76%, 0.38% and 0.19%, respectively.

In particular, among the cases, when the mesh-type common electrode is disposed at one pixel area among twenty four pixel areas, the aperture ratio was reduced most slightly.

As mentioned above, in the IPS mode LCD according to another exemplary embodiment of the present invention, because the vertical electrode portions of the mesh-type common electrode are formed to overlap with the plurality of data lines, generation of ripples due to coupling capacitance of a common electrode signal can be restrained to thus reduce a potential deviation of the common electrodes in the panel.

In addition, because the mesh-type common electrode is not formed at each unit pixel area but formed at one unit pixel area among the N number of unit pixel area, so that the reduction of the aperture ratio of the panel can be minimized and the luminance and the contrast ratio of the panel can be increased.

As so far described, the LCD and its fabrication method according to the present invention have many advantages as follows.

That is, for example, because the common electrodes are formed to overlap with the plurality of data lines, the generation of ripples due to a coupling capacitance of a common electrode signal can be restraining to reduce the potential deviation of the common electrodes in the panel.

In addition, because the mesh-type common electrode is not formed at each unit pixel area but formed at one unit pixel area among the N number of unit pixel area, so that the reduction of the aperture ratio of the panel can be minimized and the luminance and the contrast ratio of the panel can be increased.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all is changes and modifications that fall within the metes and bounds of the claims, or equivalents of such metes and bounds are therefore intended to be embraced by the appended claims.

What is claimed is:

1. A liquid crystal display device comprising:
a plurality of gate lines and a plurality of data lines formed horizontally and vertically to define pixel areas on a substrate;
thin film transistors (TFTs) formed at crossings of the gate lines and data lines;
a common line formed to be parallel to the gate line;
a gate insulating layer formed over the substrate including the gate line and the common line;
a passivation layer formed over the gate insulating layer, the data lines and the thin film transistors;
first and second contact holes within the gate insulating layer and the passivation layer to expose the common line;
a common electrode formed at each pixel area, and connected to the common line, wherein the common electrode comprises a plurality of vertical electrode portions and a horizontal electrode portion, and wherein an auxiliary vertical electrode portion of a mesh structure is further formed at one unit pixel area per N numbers of unit pixel areas and is overlapped with the whole data line in the unit pixel area and wherein the N number of unit pixel areas are three to twenty four unit pixel areas, wherein the common electrode includes the auxiliary vertical electrode portion; and
a pixel electrode connected to the TFT and formed to be parallel to the vertical electrode portions of the common electrode formed at each pixel area,
wherein each end of a first vertical electrode portion and a last vertical electrode portion of the vertical electrode portions of the common electrode at each pixel area is in contact with the common line through the first and second contact holes, respectively, and
wherein the auxiliary vertical electrode portion of the common electrode is extended from the first vertical electrode portion of the vertical electrode portions.

2. The device of claim 1, wherein the auxiliary vertical electrode portion of the common electrode is larger than the width of the data line.

3. The device of claim 1, wherein the common electrode and the pixel electrode are formed on the same plane and made of a transparent conductive metal.

4. The device of claim 1, wherein the pixel electrode comprises a horizontal portion and a plurality of vertical portions, and the horizontal portion of the pixel electrode is overlapped with the common line.

5. The device of claim 1, wherein the common electrode and the common line are formed on a different plane and made of a different conductive material, each other.

6. A liquid crystal display device comprising:
a plurality of gate lines and a plurality of data lines formed horizontally and vertically to define pixel areas on a substrate;
thin film transistors (TFTs) formed at crossings of the gate lines and data lines;
a common line formed to be parallel to the gate line;
a gate insulating layer formed over the substrate including the gate line and the common line;
a passivation layer formed over the gate insulating layer, the data lines and the thin film transistors;
first and second contact holes within the gate insulating layer and the passivation layer to expose the common line;
a common electrode formed at each pixel area, and connected to the common line, wherein the common electrode comprises a plurality of vertical electrode portions and a horizontal electrode portion, and wherein an auxiliary vertical electrode portion of a mesh structure is further formed at one unit pixel area per N numbers of unit pixel areas and is overlapped with the whole data line in the unit pixel area, wherein the N number of unit pixel areas are three to twenty four unit pixel areas so that a reduction in an aperture ratio of a panel is reduced and the luminance and contrast ratio of the panel is increased, wherein the common electrode includes the auxiliary vertical electrode portion; and
a pixel electrode connected to the TFT and formed to be parallel to the vertical electrode portions of the common electrode formed at each pixel area,
wherein each end of a first vertical electrode portion and a last vertical electrode portion of the vertical electrode portions of the common electrode at each pixel area is in contact with the common line through the first and second contact holes, respectively, and
wherein the auxiliary vertical electrode portion of the common electrode is extended from the first vertical electrode portion of the vertical electrode portions.

7. The device of claim 6, wherein the auxiliary vertical electrode portion of the common electrode is larger than the width of the data line.

8. The device of claim 6, wherein the common electrode and the pixel electrode are formed on the same plane and made of a transparent conductive metal.

9. The device of claim 6, wherein the common electrode and the common line are formed on a different plane and made of a different conductive material, each other.

10. A method for fabricating a liquid crystal display device, comprising:

forming a plurality of gate lines and a plurality of data line horizontally and vertically to define pixel areas on a substrate;

forming a TFT including a gate electrode, a semiconductor layer, and source and drain electrodes at each crossing of the gate line and the data line;

forming a common line parallel to the gate line;

forming a gate insulating layer over the substrate including the gate line and the common line;

forming a passivation layer over the gate insulating layer, the data lines and the thin film transistors;

forming first and second contact holes within the gate insulating layer and the passivation layer to expose the common line;

forming a common electrode positioned at the pixel area, and connected to the common line, wherein the common electrode comprises a plurality of vertical electrode portion and a horizontal electrode portion, and wherein an auxiliary vertical electrode portion of a mesh structure is further formed at one unit pixel area per N numbers of unit pixel areas, and is overlapped with the whole data line in the unit pixel area, wherein the N number of unit pixel areas are three to twenty four unit pixel areas; and forming a pixel electrode connected with the drain electrode and being parallel to the vertical electrode portions of the common electrode formed at each pixel area, wherein each end of a first vertical electrode portion and a last vertical electrode portion of the vertical electrode portions of the common electrode at each pixel area is in contact with the common line through the first and second contact holes, respectively, and wherein the auxiliary vertical electrode portion of the common electrode is extended from the first vertical electrode portion of the vertical electrode portions.

11. The method of claim 10, wherein the auxiliary vertical electrode portion of the common electrode overlapping with the data line is larger than the width of the data line.

12. The method of claim 10, wherein the common electrode and the pixel electrode are formed on the same plane and made of a transparent conductive metal.

13. The method of claim 10, wherein the pixel electrode comprises a horizontal portion and a plurality of vertical portions, and the horizontal portion of the pixel electrode is overlapped with the common line.

14. The method of claim 10, wherein the common electrode and the common line are formed on a different plane and made of a different conductive material, each other.

* * * * *